(12) United States Patent
Cerenzia et al.

(10) Patent No.: US 11,300,473 B2
(45) Date of Patent: Apr. 12, 2022

(54) PLUMBING STACK LEAK TEST CELL

(71) Applicant: VBC Tracy LLC, Tracy, CA (US)

(72) Inventors: Jack Cerenzia, Spokane, WA (US);
Aaron Baker, Stevens, WA (US);
Ramon Cardona, Tempe, AZ (US);
Braden Barranco, Newport, WA (US)

(73) Assignee: VBC Tracy LLC, Philadelphia, PA (US)

( * ) Notice: Subject to any disclaimer, the term of this patent is extended or adjusted under 35 U.S.C. 154(b) by 0 days.

(21) Appl. No.: 16/910,883

(22) Filed: Jun. 24, 2020

(65) Prior Publication Data
US 2020/0400529 A1 Dec. 24, 2020

Related U.S. Application Data

(60) Provisional application No. 62/865,559, filed on Jun. 24, 2019.

(51) Int. Cl.
G01M 3/28 (2006.01)
G01F 23/56 (2006.01)

(52) U.S. Cl.
CPC ........... *G01M 3/2823* (2013.01); *G01F 23/56* (2013.01)

(58) Field of Classification Search
CPC ...................................... G01F 23/56
See application file for complete search history.

(56) References Cited

U.S. PATENT DOCUMENTS

| 4,932,241 | A | 6/1990 | Carmody et al. | |
|---|---|---|---|---|
| 5,076,095 | A | 12/1991 | Erhardt | |
| 5,699,049 | A | * 12/1997 | Difiore | E03F 7/00 137/558 |
| 6,588,454 | B1 | 7/2003 | Johnson et al. | |
| 6,840,090 | B2 | 1/2005 | Smith | |
| 6,862,918 | B2 | 3/2005 | Saxton | |
| 6,912,890 | B2 | 7/2005 | Brewer | |
| 7,013,926 | B1 | 3/2006 | Storey et al. | |
| 7,264,020 | B2 | 9/2007 | Wolk | |
| 7,481,096 | B2 | 1/2009 | Brock | |
| 9,903,489 | B2 | 2/2018 | Cole et al. | |
| 9,939,346 | B2 | 4/2018 | Jerez | |
| 9,964,461 | B2 | 5/2018 | Hart et al. | |
| 10,190,298 | B2 | 1/2019 | Slate | |
| 2019/0285505 | A1* | 9/2019 | Farkas | E03F 7/00 |

FOREIGN PATENT DOCUMENTS

AU 2014101270 A4 * 11/2014

* cited by examiner

*Primary Examiner* — Paul M. West
*Assistant Examiner* — Mark A Shabman
(74) *Attorney, Agent, or Firm* — Volpe Koenig

(57) ABSTRACT

Semi-automated testing devices for a plumbing stack are disclosed. A semi-automated testing device in accordance with the present disclosure may comprise a transfer pump configured to automatically fill the plumbing stack; at least one automated gripping element configured to grip a supplemental pipe coupled to a pipe of the plumbing stack via a connection; at least one automated sealing element configured to seal the connection; and at least one sensor configured to measure a water level of the supplemental piping. A method of testing the plumbing stack with the semi-automated testing device is also disclosed.

19 Claims, 10 Drawing Sheets

SECTION 6-6

SECTION 10-10

US 11,300,473 B2

PLUMBING STACK LEAK TEST CELL

CROSS REFERENCE TO RELATED APPLICATION

This application claims the benefit of U.S. Provisional Application No. 62/865,559 filed on Jun. 24, 2019 for PLUMBING STACK LEAK TEST CELL, which is incorporated by reference as if fully set forth.

FIELD OF INVENTION

The present invention relates generally to a plumbing stack. More particularly, the present invention relates to a semi-automated testing device for plumbing stacks.

BACKGROUND

Section 312.2 of the 2018 International Plumbing Code ("Code") requires that plumbing stacks undergo drainage and vent water testing. Specifically, the Code requires that a water test be applied to the drainage system in its entirety or in sections. If applied to the entire system, all openings in the piping shall be tightly closed, except the highest opening, and the system shall be filled with water to the point of overflow. If the system is tested in sections, each opening shall be tightly plugged except the highest openings of the sections undergoing testing, and each section shall be filled with water. However, sections shall not be tested with less than a 10-foot head of water.

Currently, these tests are performed manually and are therefore time consuming and prone to error. As such, it would be advantageous to have a streamlined testing mechanism for plumbing stacks.

SUMMARY

Semi-automated testing devices for a plumbing stack are disclosed. A semi-automated testing device in accordance with the present disclosure may comprise a transfer pump configured to automatically fill the plumbing stack; at least one automated gripping element configured to grip a supplemental pipe coupled to a pipe of a plumbing stack to be tested via a connection; at least one automated sealing element configured to seal the connection; and at least one water level sensor configured to measure a water level of the supplemental piping. A method of testing the plumbing stack with the semi-automated testing device is also provided.

DETAILED DESCRIPTION

A semi-automated testing device for a plumbing stack is disclosed. The testing device is a streamlined testing mechanism for plumbing stacks. The testing device may be used inside a factory to test newly assembled plumbing stacks to confirm that they are sealed properly before they are inserted into walls.

Figure 1:
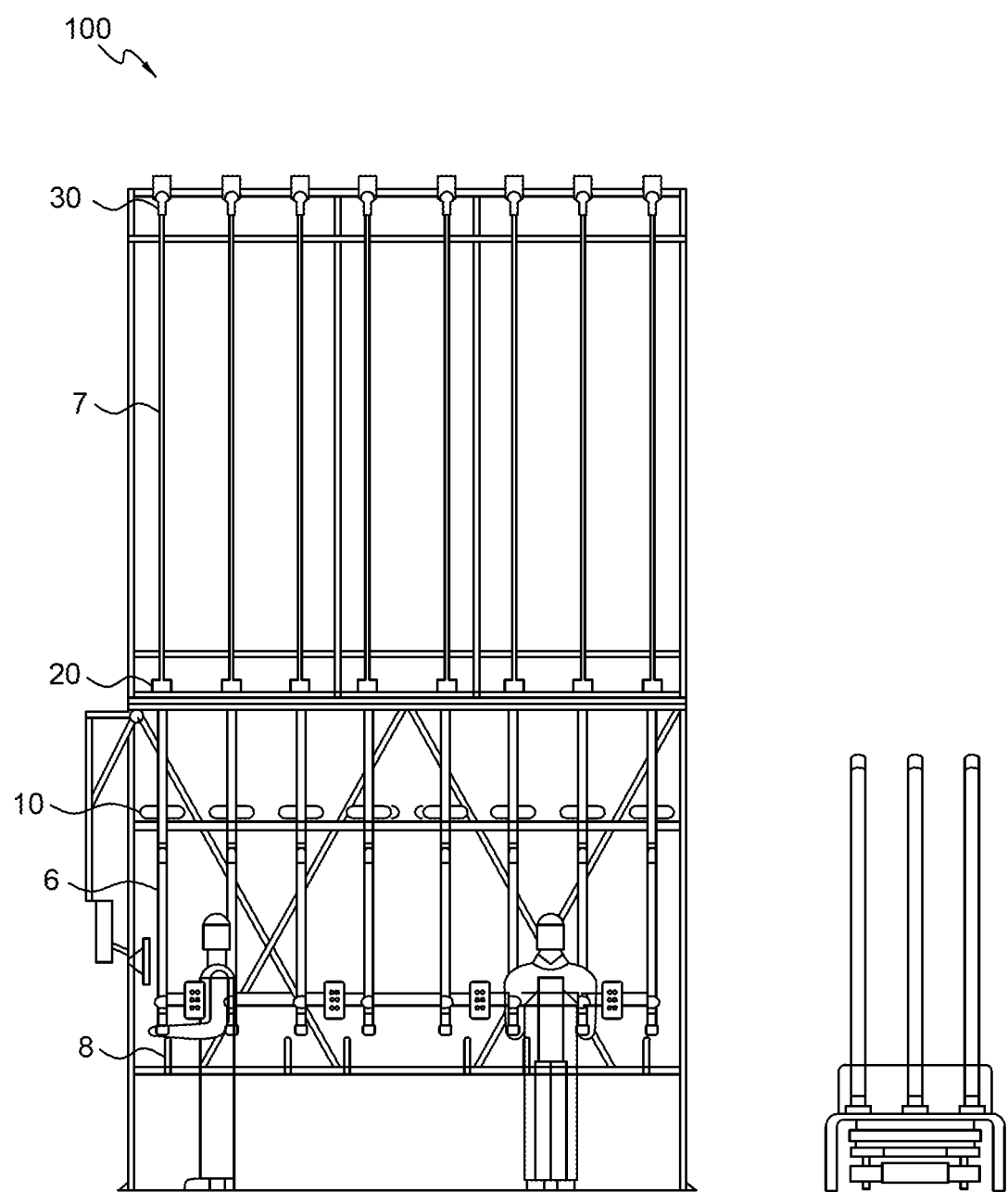
FIG. 1 is a front view of a testing device in accordance with the present disclosure.
Figure 2:
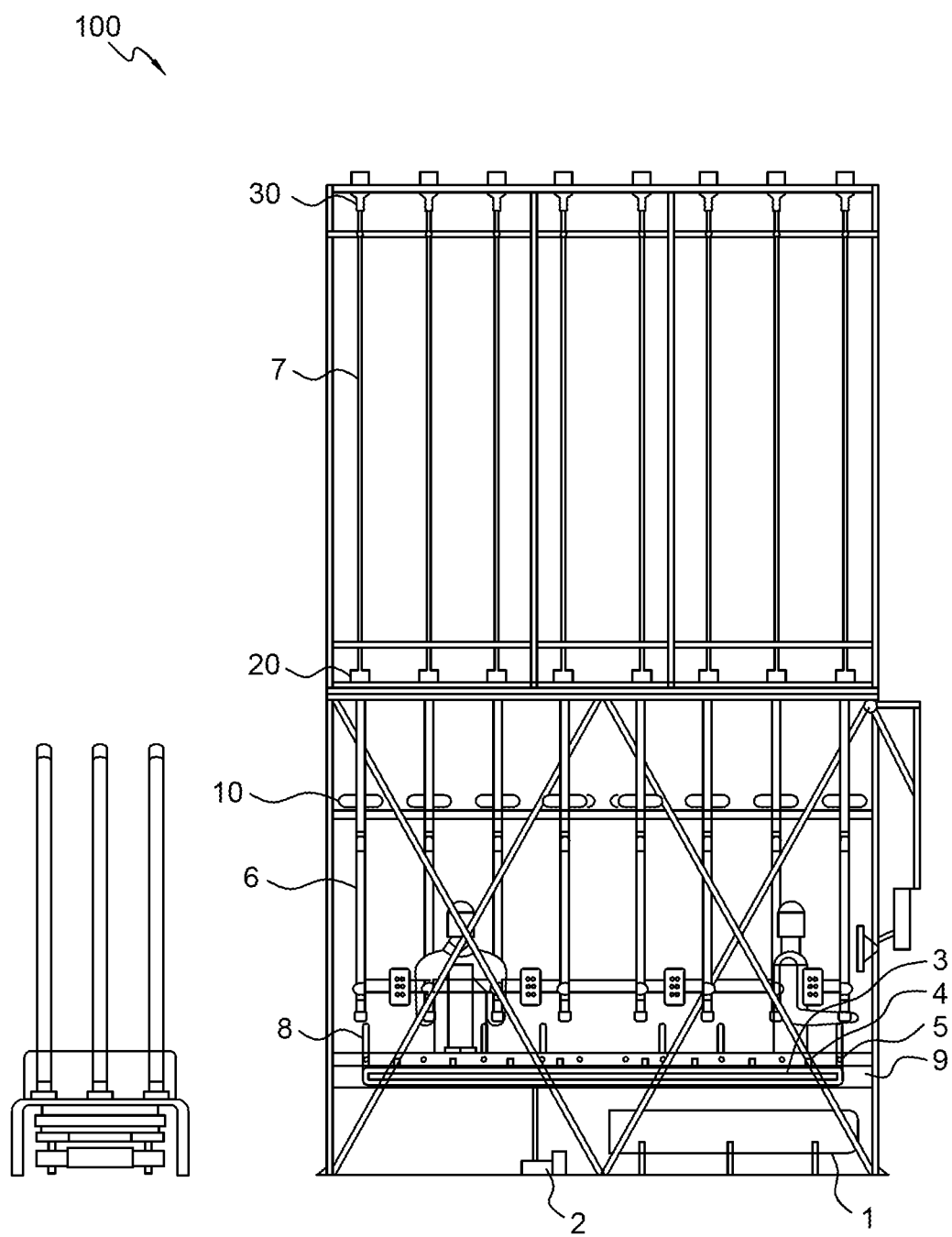
FIG. 2 is a back view of the testing device of FIG. 1.

FIG. 1 is a front view of a testing device 100. FIG. 2 is a back view of the testing device 100 of FIG. 1. With reference to FIGS. 1 and 2, a semi-automated testing device 100 for performing drainage and vent water testing on a plumbing stack 6 is provided. Certain components of the testing device 100 may be automated. For example, the testing device 100 may comprise at least one automated gripping element 10, at least one automated sealing element 20, at least one automated water level sensor 30, and a transfer pump 2 for automatically filling of the plumbing stack 6. These automated elements eliminate time consuming and error-prone manual steps of testing plumbing stacks.

The testing device 100 may also comprise one or more of the following components: a water reservoir 1, a water manifold 3 for distribution to all stacks, a directional control valve 4 for controlled filling, a drain manifold 5, a trough 9 for catching leaks, supplemental piping 7 for the required water head and a fitting 8 for filling and draining of the plumbing stack 6.

As shown in FIGS. 1 and 2, the plumbing stack 6 is installed into the testing device 100. Pipes of the plumbing stack 6 runs up through the automated gripping elements 10 to the automated sealing elements 20. The automated sealing elements 20 connect the pipes of the plumbing stack 6 to the supplemental piping 7. The supplemental piping 7 connects to the automated water level sensors 30.

Figure 3:
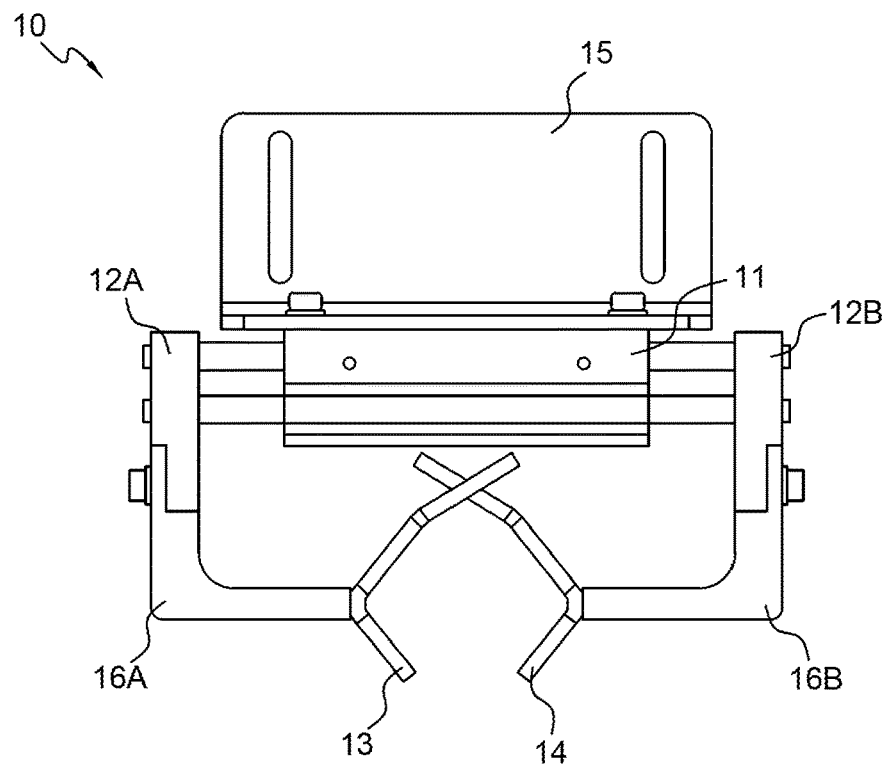
FIG. 3 is a top view of an automated gripping element of the testing device of FIG. 1.
Figure 4:
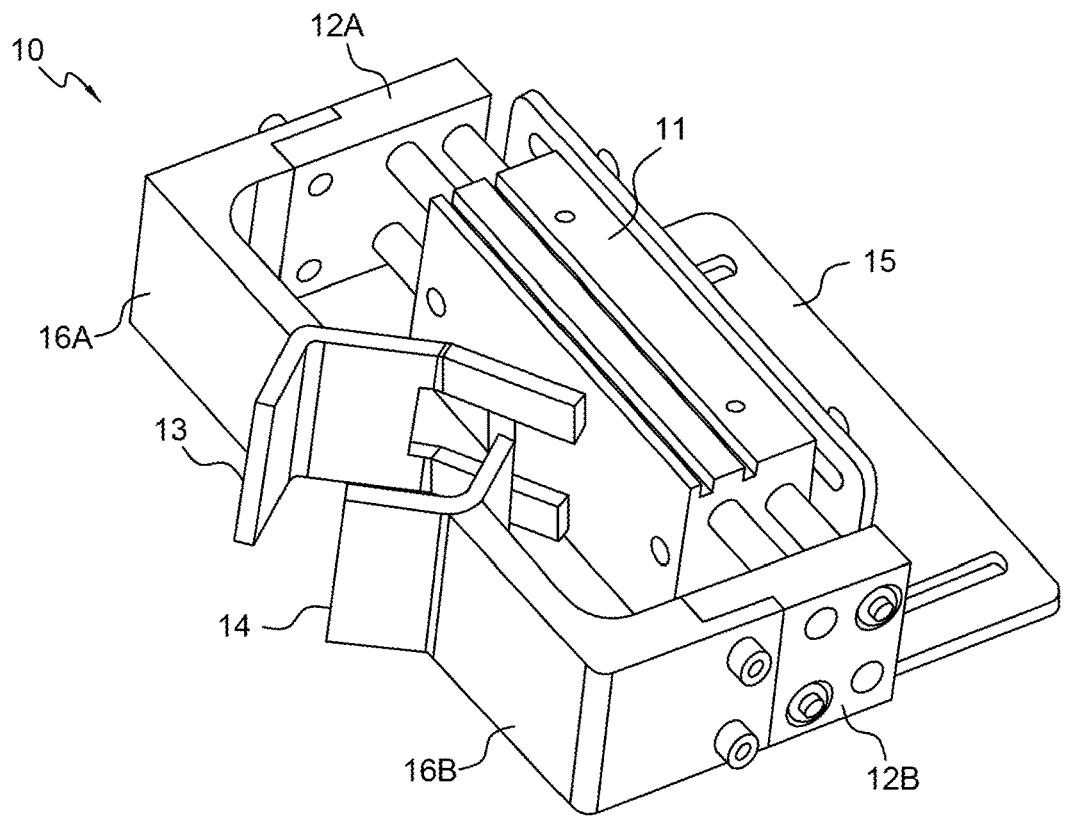
FIG. 4 is a perspective view of the automated gripping element of FIG. 3.

FIG. 3 is a top view of an automated gripping element 10 of the testing device 100 of FIG. 1. FIG. 4 is a perspective view of the automated gripping element 10 of FIG. 3. The automated gripping element 10 grips and secures the plumbing stack 6 to the testing device 100. The gripping element 10 reduces movement of the plumbing stack 6 during testing and thereby prevents damages to the plumbing stack 6. With reference to FIGS. 3 and 4, the at least one automated gripping element 10 may comprise a two finger clamp 13 and a single finger clamp 14 for gripping and securing a pipe of the plumbing stack 6 during testing. The testing device 100 may include multiple gripping elements 10 so that one gripping element 10 may be pair with one pipe of the plumbing stack 6. Alternatively, the testing device 100 may include multiple gripping elements 10 per pipe of the plumbing stack 6. The two finger clamp 13 may be coupled to a first gripping bracket 16A and the single finger clamp 14 may be coupled to a second gripping bracket 16B. The first gripping bracket 16A may be coupled to a first jaw portion 12A and the second gripping bracket 16B may be coupled to a second jaw portion 12B. The first jaw portion 12A and the second jaw portion 12B may be connected via a body portion 11. The body portion 11 may be attached to a clamp mount bracket 15. The automated gripping element 10 may be attached to the testing device 100 via the clamp mount bracket 15.

Figure 5:
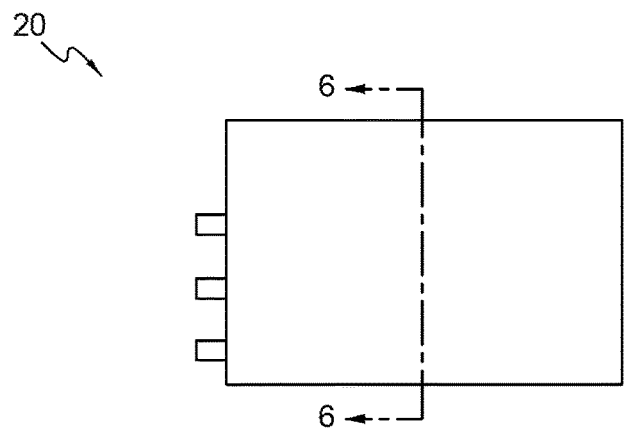
FIG. 5 is a side view of an automated sealing element of the testing device of FIG. 1.
Figure 6:
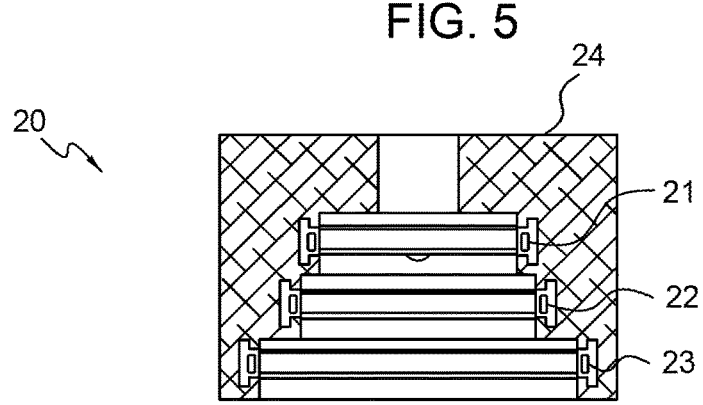
FIG. 6 is a section along line 6-6 of FIG. 5.
Figure 7:
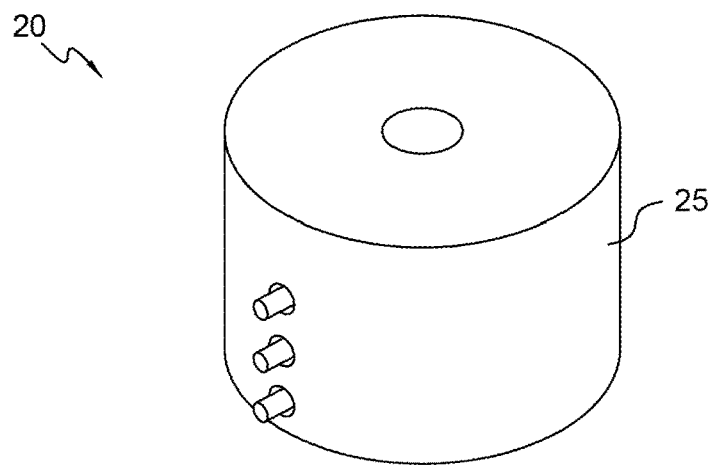
FIG. 7 is a perspective view of the automated sealing element of FIG. 5.

FIG. 5 is a side view of an automated sealing element 20 of the testing device 100 of FIG. 1. FIG. 6 is a section along line 6-6 of FIG. 5. FIG. 7 is a perspective view of the automated sealing element 20 of FIG. 5. With reference to FIGS. 5-7, the at least one automated sealing element 20 is automated and may comprise at least one pipe seal. The at least one pipe seal may provide for automated pneumatic sealing between a pipe of the plumbing stack 6 and a pipe of the supplemental piping 7, as shown in FIGS. 1 and 2. In an embodiment, the at least one automated sealing element 20 comprises a pipe seal for a first diameter 21, a pipe seal for a second diameter 22, and a pipe seal for a third diameter 23. The automated sealing element 20 may accommodate plumbing stacks 6 having various diameter pipe. The pipe seals 21, 22, 23 may be enclosed in a case 25. The at least one automated sealing element 20 may further comprise a top pressurized housing 24.

Figure 8:
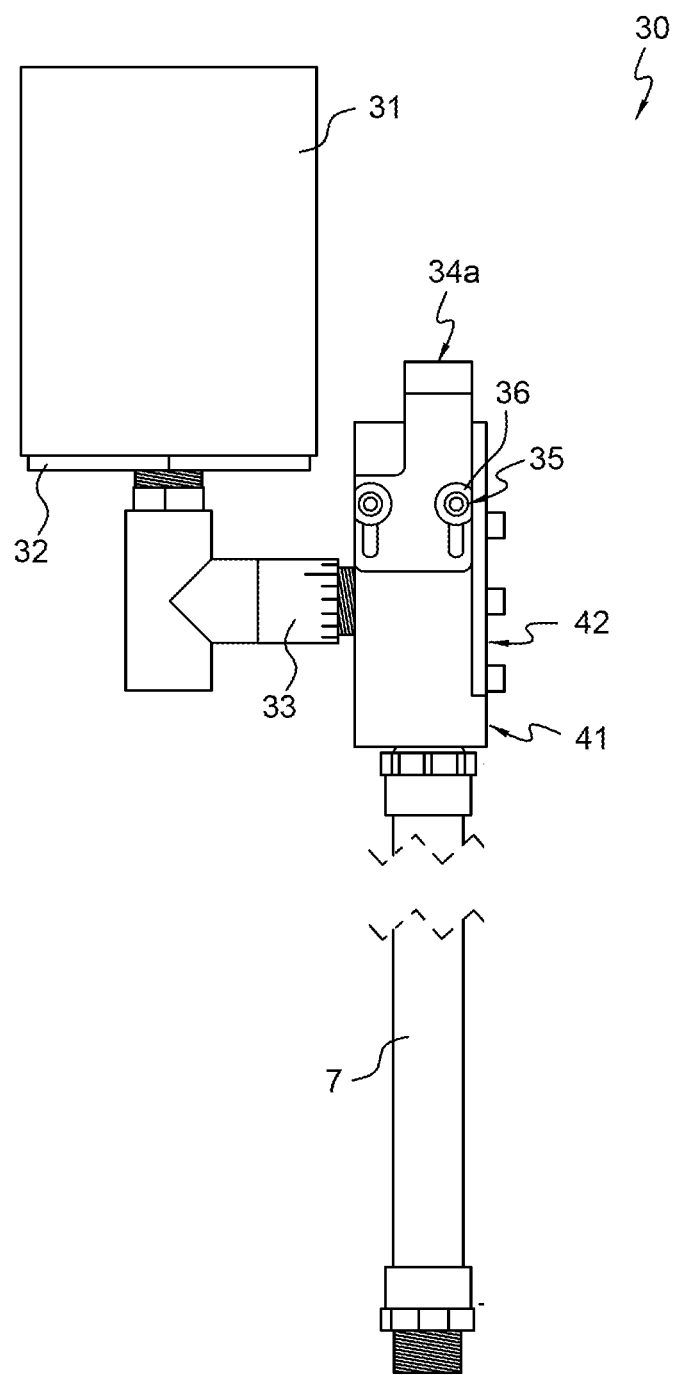
FIG. 8 is a side view of a water level sensor of the testing device of FIG. 1.
Figure 9:
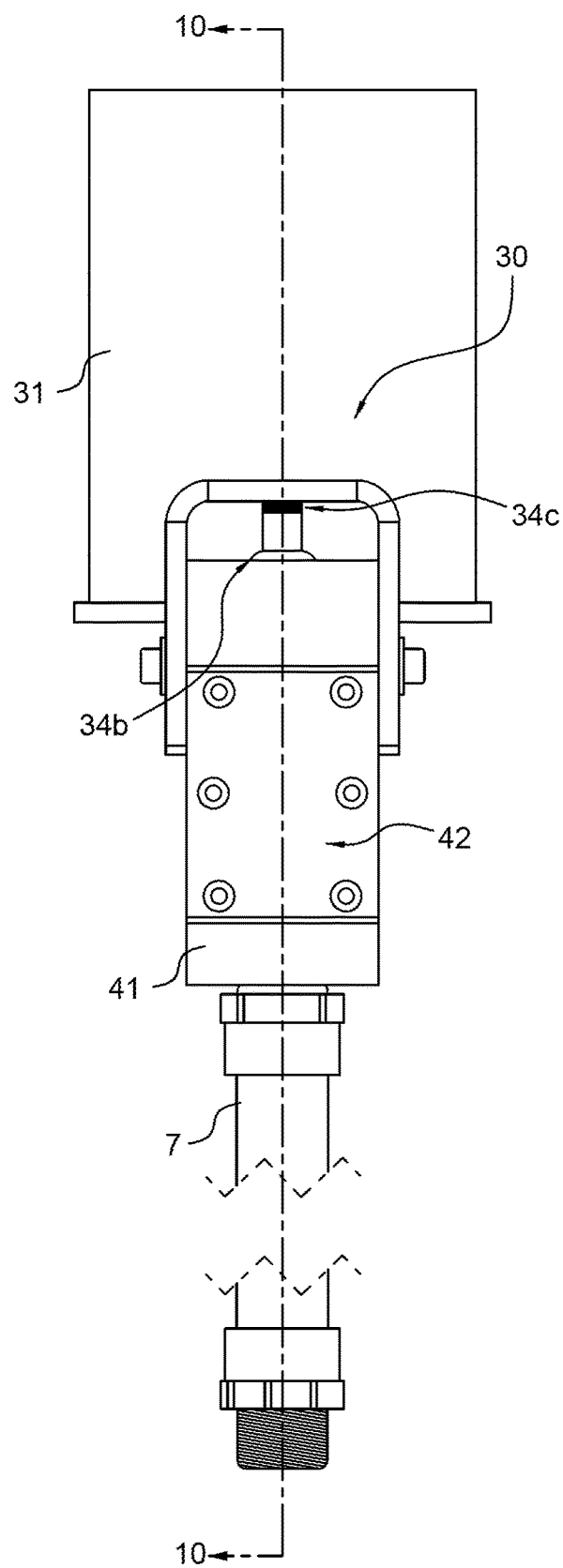
FIG. 9 is a back view of the water level sensor of FIG. 8.
Figure 10:
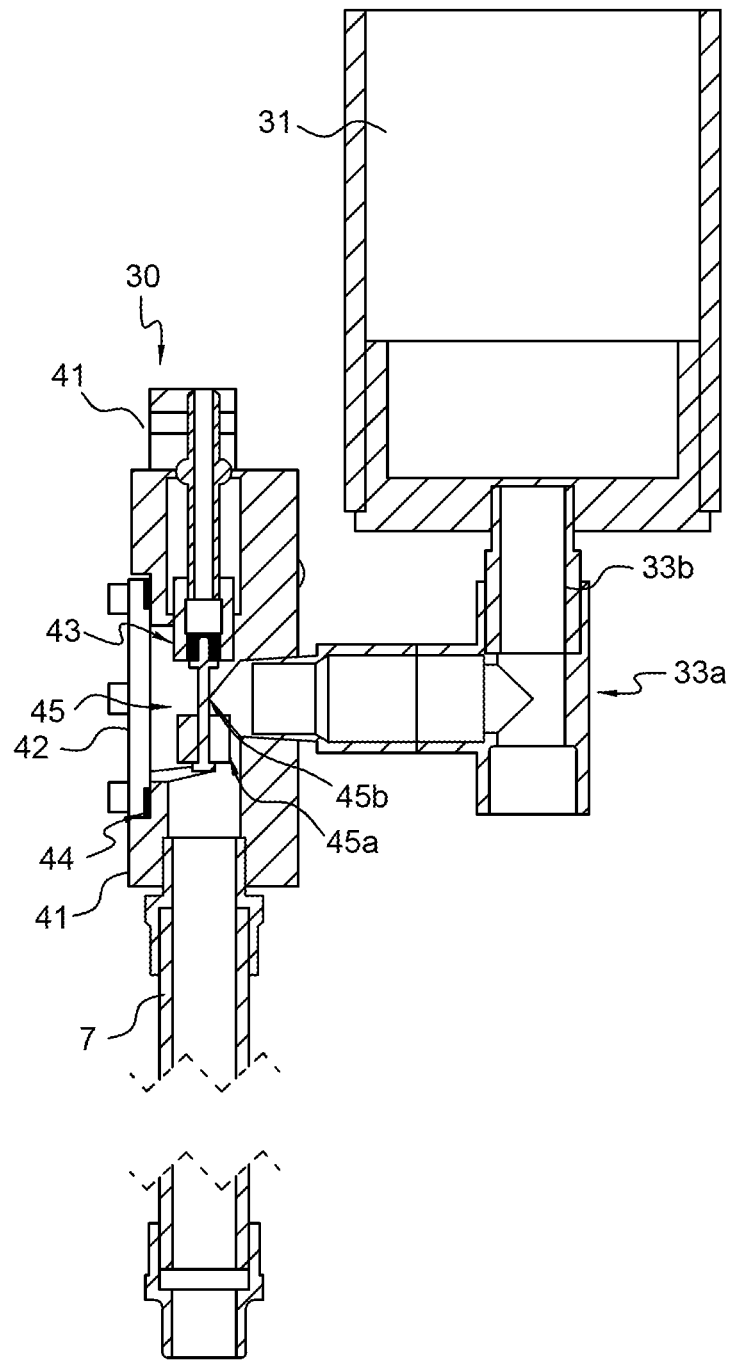
FIG. 10 is a section along line 10-10 of FIG. 9.
Figure 11:
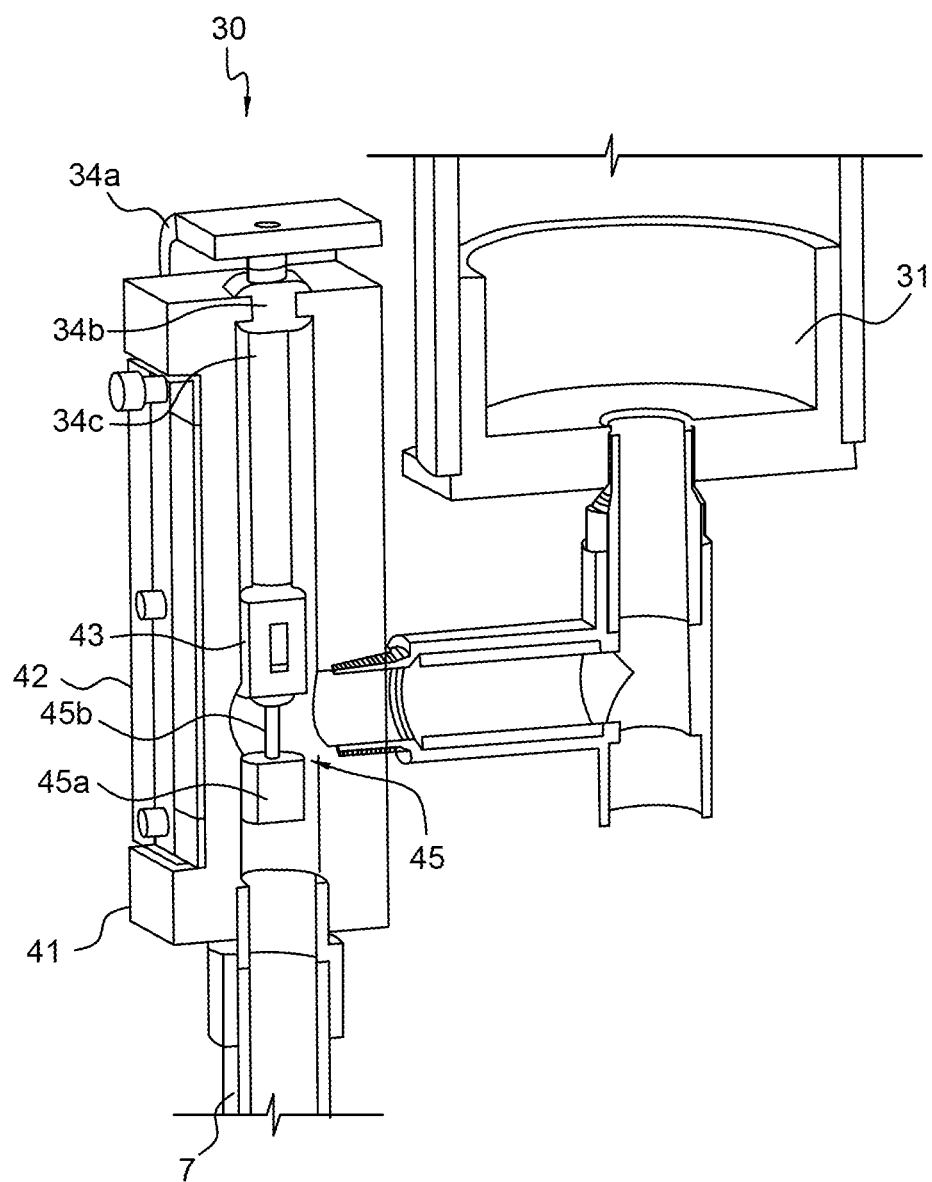
FIG. 11 is an enlarged fragmentary view of parts of the water level sensor of FIG. 8.
Figure 12:
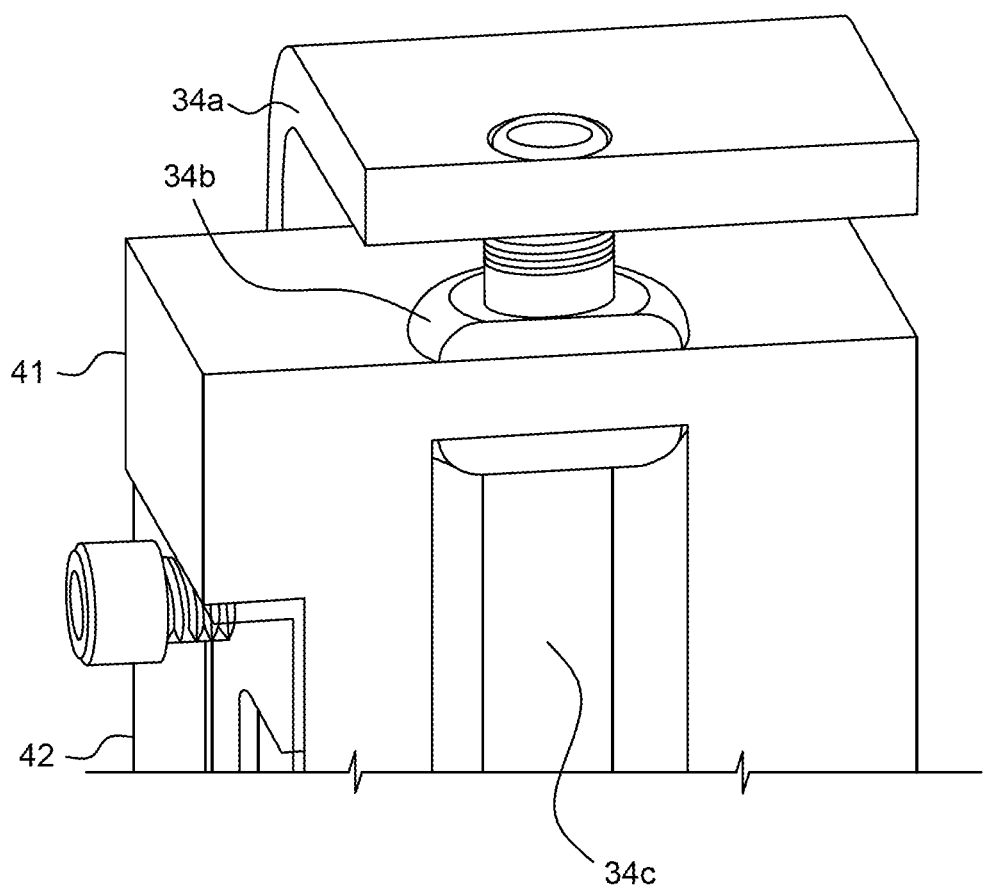
FIG. 12 is an enlarged fragmentary view of parts of the water level sensor of FIG. 8.

FIG. 8 is a side view of a water level sensor 30 of the testing device 100 of FIG. 1. FIG. 9 is a back view of the water level sensor 30 of FIG. 8. FIG. 10 is a section along line 10-10 of FIG. 9. With reference to FIGS. 8-10, the at least one water level sensor 30 is configured to measure the water level in the plumbing stack 6 to detect leaks. In an embodiment, the at least one water level sensor 30 comprises a bobber sensor 45. The bobber sensor 45 comprises a bobber 45*a* attached to a base 45*b*. The bobber sensor 45 is configured to measure a level of water within the water level sensor 30. The bobber sensor 45 may be located in a body portion 41 of the water level sensor 30. The body portion 41 may comprise a window 42 made of a clear material, such as a clear acrylic, so that the bobber sensor 45 may be viewed from the outside. A gasket 44 may be located between the body portion 41 and the window 42 to seal the window 42.

The body portion 41 of the at least one water level sensor 30 may be coupled to the supplemental piping 7 connected to the plumbing stack 6. The at least one water level sensor 30 may also be coupled to a pipe element 31 via a first coupling element 33 and an adapter 32. The first coupling element 33 may comprise a tee connector 33*a* and a socket connector 33*b*. The pipe element 31 is configured to receive an overflow of water from the supplemental piping 7.

The at least one sensor 30 may further comprise an adjustment mechanism 34 for adjusting the height of the bobber sensor 45. In an embodiment, the adjustment mechanism 34 may comprise an adjustment bracket 34*a*, a grommet 34*b*, and a pipe 34*c*. In an embodiment, the height of the adjustment bracket may be adjustable via a screw 35 and a washer 36. The grommet 34*b* may center the pipe 34*c* within the body portion 41. In an embodiment, the pipe 34*c* may be comprised of steel. A first end of the pipe 34*c* may be coupled to the adjustment bracket 34*a*. A second end of the pipe 34*c* opposite the first end may be coupled to a first end of a second coupling element 43. A second end of the second coupling element 43 opposite the first end may be coupled to the bobber sensor 45.

Figure 13:
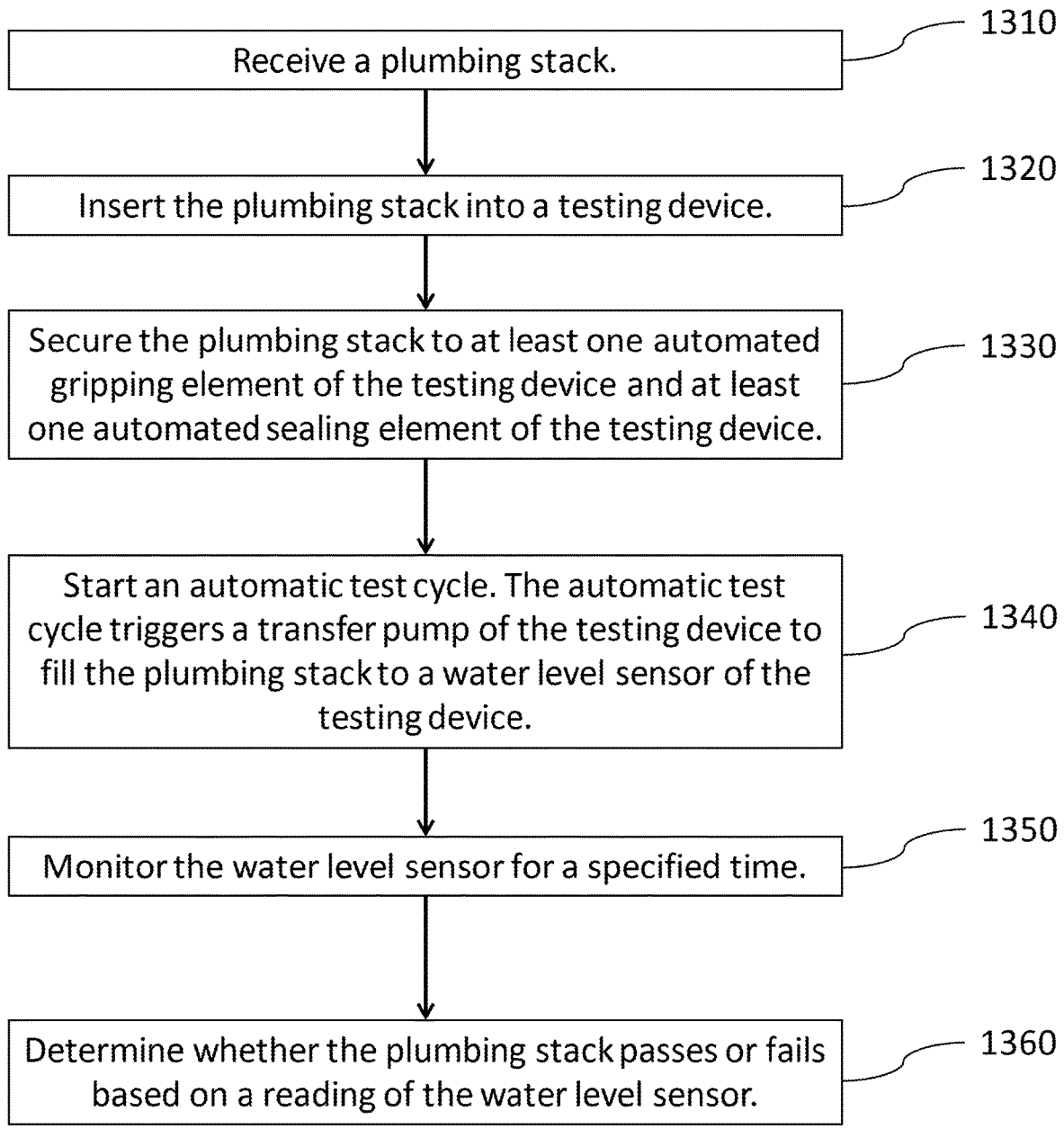
FIG. 13 is a flow chart of a method of testing a plumbing stack with the testing device.

FIG. 13 is a flow chart of a method 1300 of testing a plumbing stack 6 with the testing device 100. Step 1310 includes receiving a plumbing stack 6. The plumbing stack 6 includes the details and embodiments of a plumbing stack 6 described above.

Step 1320 includes inserting the plumbing stack 6 into the testing device 100 for testing.

Step 1330 includes securing the plumbing stack 6 to at least one automated gripping element 10 and at least one automated sealing element 20 of the testing device 100. The automated gripping elements 10 and the automated sealing elements 20 include the details and embodiments described above. After the plumbing stack 6 is inserted into the testing device 100, the two finger clamp 13 and the single finger clamp 14 of each automated gripping element 10 grips and secures a pipe of the plumbing stack 6 to the testing device 100. The pipes of the plumbing stack 6 extend up through the gripping elements 10 of the testing device 100 to the automated sealing elements 20. Each automated sealing element 20 automatically seals a pipe of the plumbing stack 6 with a supplemental piping 7 of the testing device 100. As stated above, the supplemental piping 7 provides the required water head for testing. In one embodiment, the supplemental piping 7 may provide 10 feet of water head for testing. After the plumbing stack 6 is secured to at least one automated gripping element 10 and at least one automated sealing element 20 of the testing device 100, an operator may connect a hose to the water source and plug any remaining openings in the plumbing stack 6.

Step 1340 includes starting the automatic test cycle. When the automatic test cycle begins, actuators may open and a water pump 2 turns on to fill the plumbing stack 6. The plumbing stack 6 and testing device 100 are filled with water to the at least one automated water level sensor 30. The automated water level sensors 30 include the details and embodiments described above. Once the water reaches a height within the water level sensor 30 that the bobber sensor 45 may read the water level, the actuators are closed and the water is turned off. After the water is turned off, a timer may begin.

Step 1350 includes monitoring the water level for a specified time. The specified time may be determined by engineering or plumbing standards and/or codes. The water level is monitored by the water level sensors 30. The water level sensors 30 read and indicate whether the water level drops below a specified level. If the water level drops below the specified level, there may be a leak or defect in the plumbing stack 6. The water level sensors 30 may read "on" when the water level is above the specified level and "off" when the water level is below the specified level.

Step 1360 includes determining whether the plumbing stack 6 passes or fails based on a reading of the water level sensors 30. If any of the water level sensors 30 read "off" or otherwise indicate that the water level dropped below an acceptable specified level, the plumbing stack 6 fails. If all the water level sensors 30 read "on" or otherwise indicate an acceptable water level throughout the duration of testing, the plumbing stack 6 passes. If the plumbing stack 6 passes, the stack may be certified per engineering or plumbing standards or codes such as Section 312.2 of the 2018 International Plumbing Code. After the test is complete, the testing device 100 may automatically dump the water from the plumbing stack 6 and testing device 100. The plumbing stack 6 may also be released from the testing device 100. Passing or certified plumbing stacks 6 may be prepared for delivery while failing plumbing stacks 6 may be disposed.

Having thus described in detail a preferred selection of embodiments of the present invention, it is to be appreciated and will be apparent to those skilled in the art that many physical changes could be made to the testing device 100 without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. A testing device for a plumbing stack, the testing device comprising:
   a transfer pump configured to automatically fill the plumbing stack;
   at least one automated gripping element connected to a testing device structure, configured to grip a supplemental pipe coupled to a pipe of the plumbing stack via a connection, and configured to secure the supplemental pipe to the testing device structure;
   at least one automated sealing element configured to seal the connection; and
   at least one sensor configured to measure a water level of the supplemental piping.

2. The testing device of claim 1, wherein the at least one automated gripping element comprises a two finger clamp and a single finger clamp.

3. The testing device of claim 1, wherein the at least one automated sealing element comprises a first pipe seal for a first connection diameter.

4. The testing device of claim 3, wherein the at least one automated sealing element further comprises a second pipe seal for a second connection diameter and a third pipe seal for a third connection diameter.

5. The testing device of claim 1, wherein the at least one sensor comprises a body portion coupled to the supplemental piping.

6. The testing device of claim 5, wherein the at least one automated level sensor comprises a bobber sensor located in the body portion.

7. The testing device of claim 6, wherein the body portion includes a clear portion for viewing the bobber sensor.

8. The testing device of claim 6, wherein the bobber sensor is coupled to a pipe via a coupling element.

9. The testing device of claim 8, wherein the pipe is coupled to an adjustable bracket.

10. The testing device of claim 9, wherein a height of the adjustable bracket is adjustable via a screw configured to be threaded in the body portion.

11. The testing device of claim 1, wherein a body portion of the sensor is coupled to a pipe element configured to receive an overflow of water from the supplemental piping.

12. The testing device of claim 1, wherein the plumbing stack comprises a plurality of pipes and there is at least one sensor for each pipe of the plurality of pipes of the plumbing stack.

13. The testing device of claim 1, wherein the plumbing stack comprises a plurality of pipes and there is at least one automated sealing element for each pipe of the plurality of pipes of the plumbing stack.

14. The testing device of claim 1, wherein the plumbing stack comprises a plurality of automated gripping elements.

15. A method of testing a plumbing stack comprising:
   receiving the plumbing stack;
   securing the plumbing stack to at least one automated gripping element of a testing device, the at least one automated gripping element connected to a testing device structure and configured to secure the plumbing stack to the testing device structure;
   securing the plumbing stack to at least one automated sealing element of the testing device; and
   starting an automatic test cycle, the automatic test cycle triggers a transfer pump to fill the plumbing stack to a water level sensor of the testing device;
   monitoring the water level sensor; and
   determining whether the plumbing stack passes or fails based on a reading of the water level sensor.

16. The method of claim 15, wherein the reading of the water level sensor is at least one of on and off.

17. The method of claim 16, wherein the plumbing stack passes if the water level sensor is on for a specified time.

18. The method of claim 16, wherein the plumbing stack fails if the water level sensor turns off during a specified time.

19. The method of claim 15, wherein the water level sensor includes a bobber sensor configured to measure a level of water.

\* \* \* \* \*